United States Patent [19]

Ming-Shun

[11] Patent Number: 5,562,144
[45] Date of Patent: Oct. 8, 1996

[54] ROLLING SHADE DEVICE FOR REAR WINDOW OF CAR

[75] Inventor: Yang Ming-Shun, Taipei, Taiwan

[73] Assignee: Formosa Saint Jose Corp., Taipei, Taiwan

[21] Appl. No.: 324,340

[22] Filed: Oct. 17, 1994

[51] Int. Cl.$^6$ ...................................................... B60J 1/20
[52] U.S. Cl. .................................... 160/370.22; 296/97.8
[58] Field of Search ..................... 160/370.22, 370.21; 296/97.8

[56] References Cited

U.S. PATENT DOCUMENTS

| | | | |
|---|---|---|---|
| 4,836,263 | 6/1989 | Ament | 160/370.22 X |
| 4,869,542 | 9/1989 | Lin | 160/370.22 X |
| 4,898,224 | 2/1990 | Woodworth | 160/370.22 X |
| 5,098,149 | 3/1992 | Lee | 160/370.22 X |
| 5,172,745 | 12/1992 | Wang | 160/370.22 |

*Primary Examiner*—Philip C. Kannan
*Attorney, Agent, or Firm*—Erik M. Arnhem

[57] ABSTRACT

The present invention consists of a rolling shade carrier, a rolling shade capable of automatic contraction into the carrier by means of a spring, two movable clips, a fixed clip, two support rods, a tractive line and a motor base with an interior line winding motor; the fixed clip and two movable clips are installed on the rolling shade carrier, and the fixed clip is further fixed on the motor base so as to interconnect the motor base and the rolling shade carrier as one body; one end of each support rod is inserted into the recess provided in each associated movable clip, and another end thereof is inserted into the hole on a pulley holder so that the support rods can bear the holder against the ceiling of a car.

2 Claims, 5 Drawing Sheets

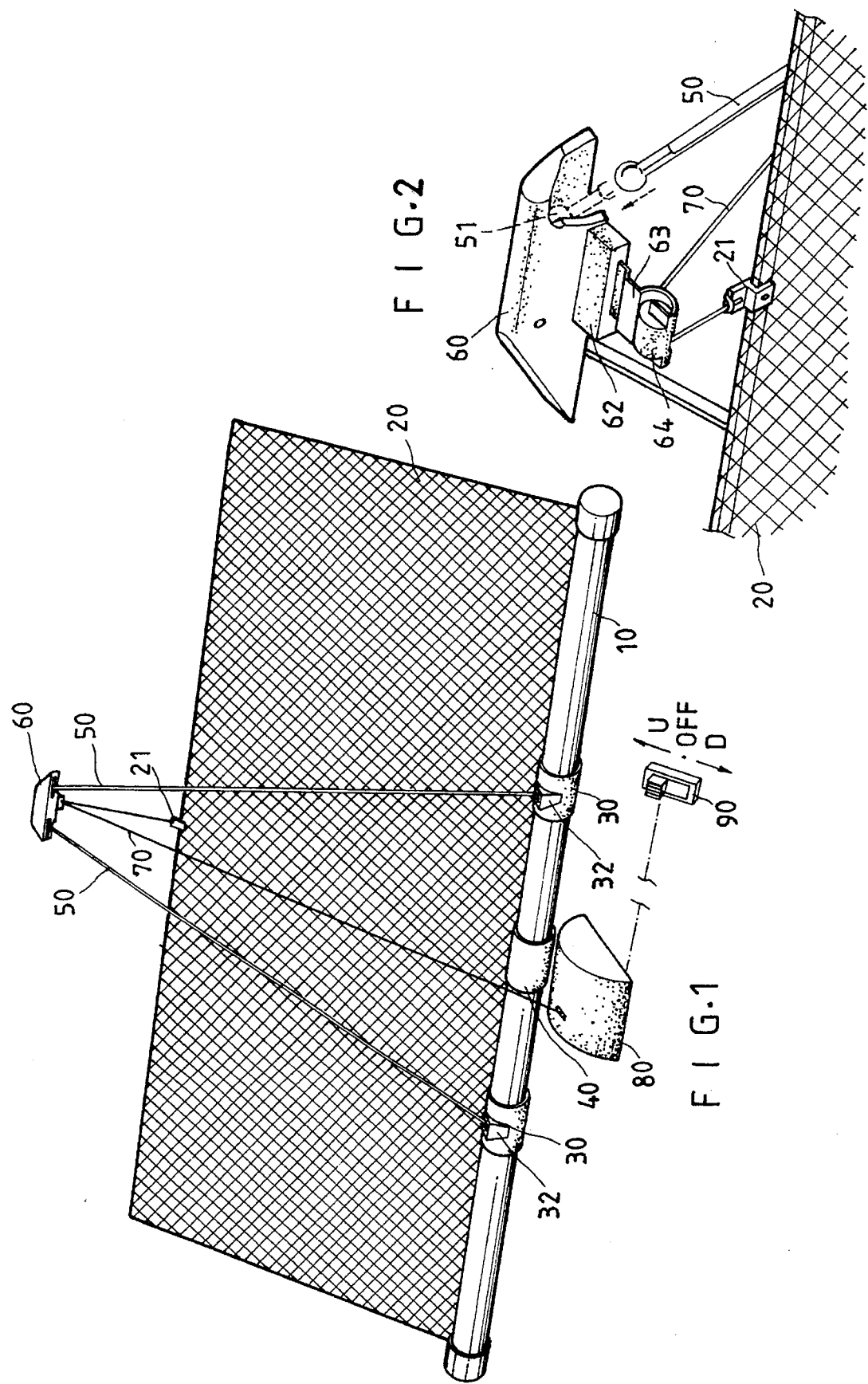

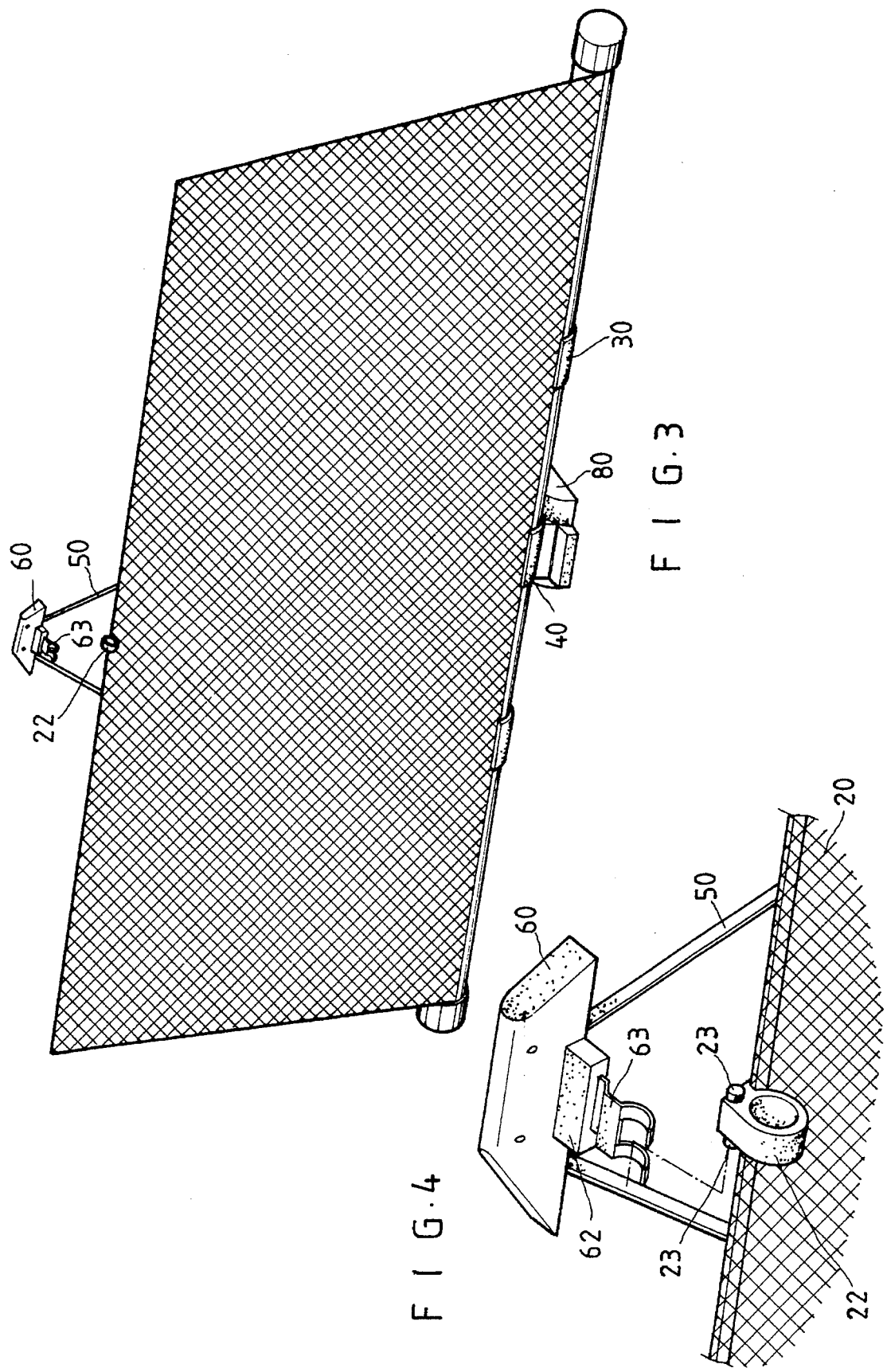

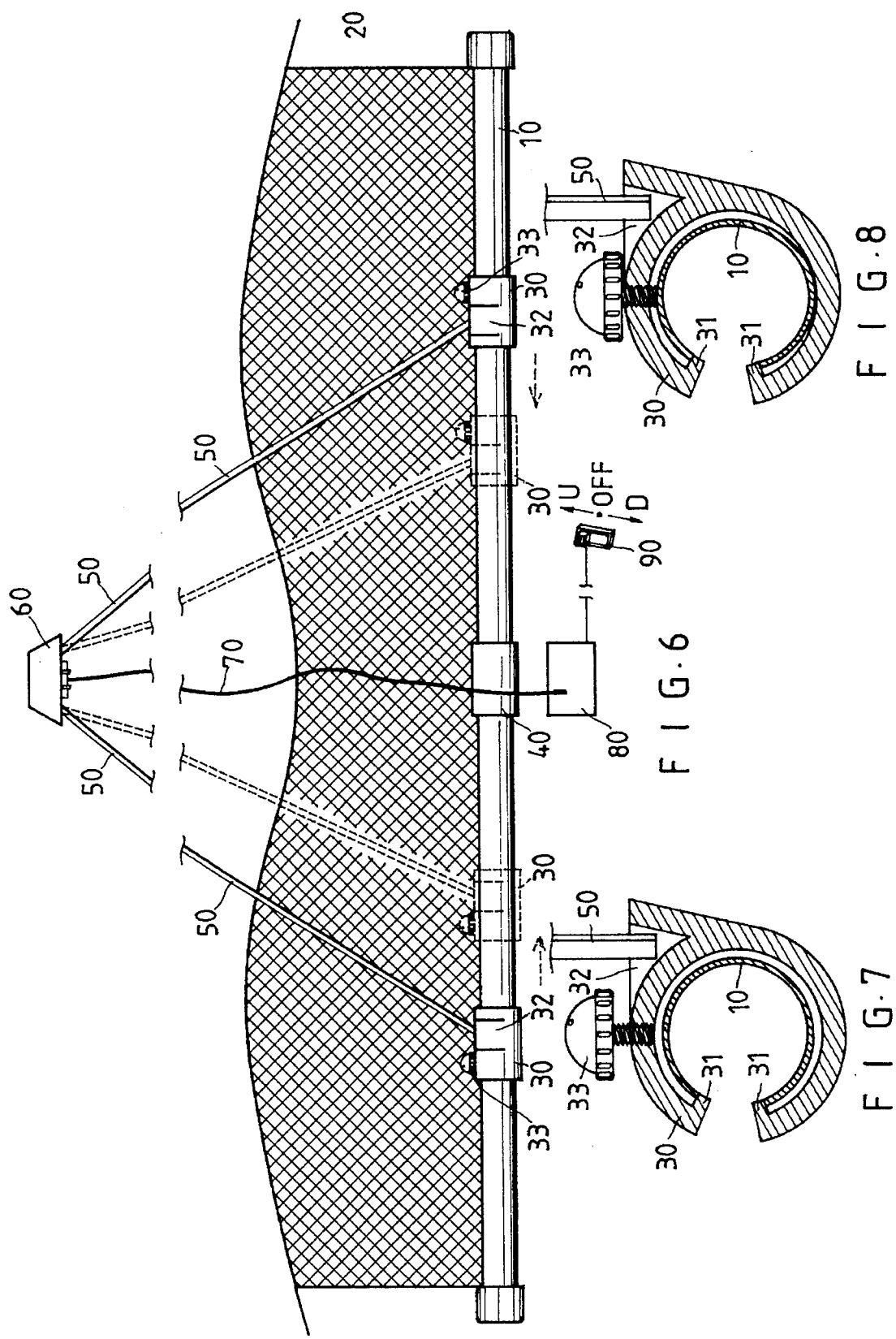

ROLLING SHADE DEVICE FOR REAR WINDOW OF CAR

BACKGROUND OF THE INVENTION

There are various car window curtains or shades designed to prevent sun rays from radiating into the car passenger compartment. Typically such curtains or shades can be heat proof paper sheets, slat-type blinds, or rolling screens. Such constructions have certain disadvantages. For example, blinds and rolling screens commonly have to be installed in the car, using drilled holes, screws or other fastener systems; the installation procedures are time-consuming and often inconvenient. The installation holes have the effect of damaging or disfiguring the car interior surface.

SUMMARY OF THE INVENTION

The present invention relates to a shade device for the rear window of an automobile designed to eliminate some advantages of the prior art devices. More particularly, the invention contemplates a rear window shade device that can be installed quickly and easily, without marring or damaging the automobile interior surfaces. The shade device is adapted for easy operation and a relatively long service life.

One illustrative embodiment of the invention comprises a base adapted to rest on the rear shelf of a sedan automobile proximate to the automobile rear window for supporting a horizontal tubular carrier that houses a flexible shade element. A pulley holder is biased against the interior roof surface of the automobile by means of two support rods that have their lower ends seated in sockets on two C-shaped clips that are slidably adjustable on the tubular carrier. These clips can be manually moved toward each other to cause the support rods to apply upward pressures on the pulley holder, thereby enabling the holder to have pressure engagement on the roof surface without need for drilled holes or special fasteners.

The base comprises an electrically-operated line winding means designed to exert a winding force on a traction line that extends around the pulley and down to an attachment on an exposed edge of the aforementioned shade element, whereby operation of the line winding means draws the shade element out of the tubular carrier to an operative condition covering the rear window of the automobile. When the line-winding means is deactivated a coil spring in the tubular carrier draws the shade element into the carrier.

One advantage of the described invention embodiment is that the assembly is easily installed in the automobile without special tools or procedures. The assembly can be removed from the automobile, if necessary, without disfiguring or marring the automobile interior surface. Further advantages and features of the invention will be apparent from the attachment drawings and description of an illustrative embodiment of the invention.

BRIEF DESCRIPTION OF THE INVENTION

FIG. 1 is an elevational view of a rolling shade device according to the present invention.

FIG. 2 is an enlarged fragmentary view of a pulley holder used in the FIG. 6 device.

FIG. 3 is an elevational view of the FIG. 1 device equipped with a mechanism for manually operating the rolling shade of the present invention.

FIG. 4 is an enlarged fragmentary view of the FIG. 3 structure, showing the relation between the grip and holder provided to the rolling shade of the present invention.

FIG. 6 is a view taken in the direction of FIG. 1 and showing certain movable clips capable of sliding on the rolling shade base of the present invention.

FIG. 7 is a section view of movable clips shown in FIG. 6.

FIG. 8 is a section view of the FIG.7 movable clip in a clamped condition on the rolling shade carrier of the present invention.

Figure 5:
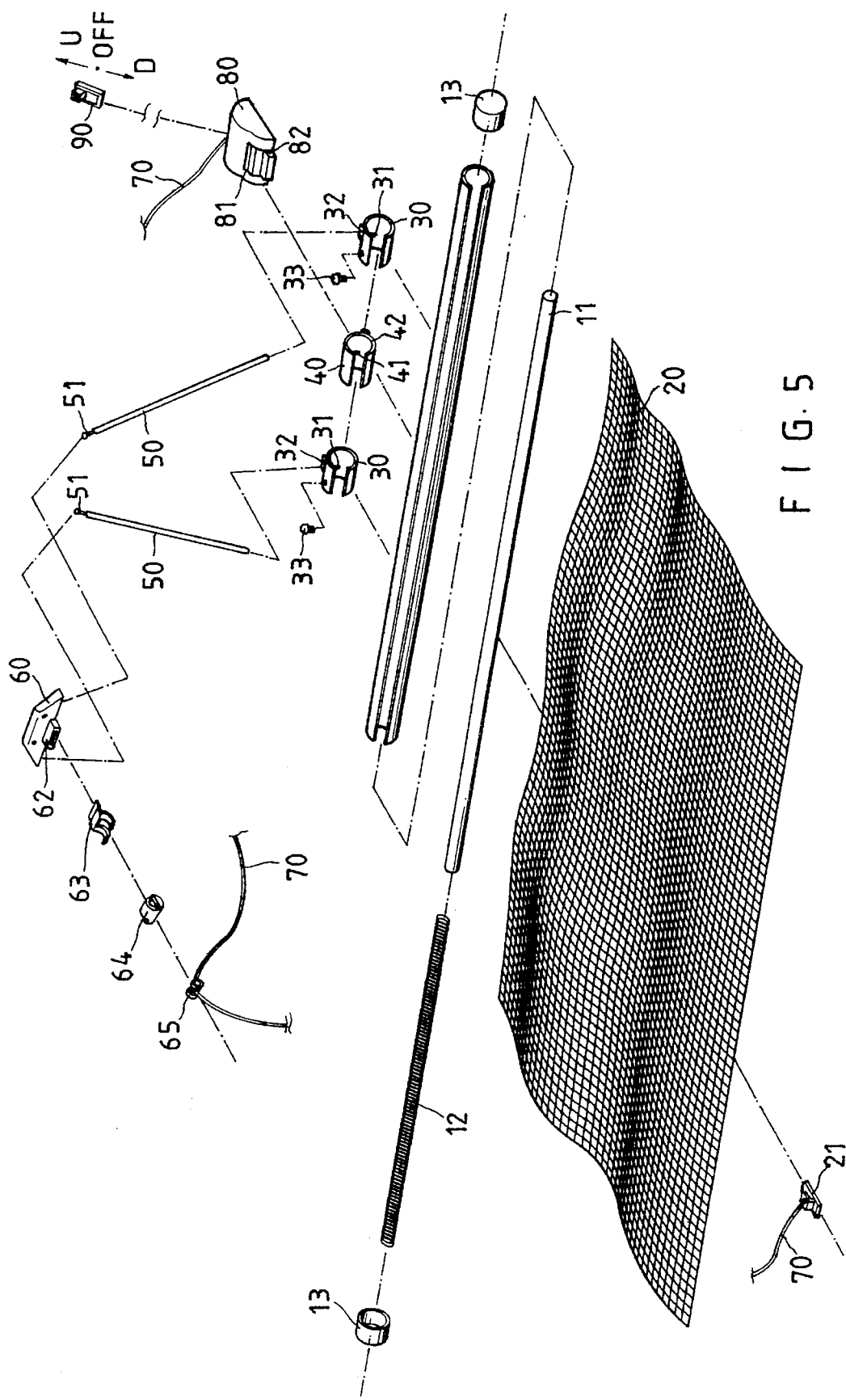
FIG. 5 is an exploded view of the rolling shade device of the present invention.

DETAILED DESCRIPTION:

As shown in FIG. 1 and 5, the rolling shade device for an automobile rear window of the present invention essentially consists of a rolling shade carrier (10), a rolling shade (20), two movable clips (30), a fixed clip (40), two support rods (50), a pulley holder (60), a tractive line (70) and a base (80) for a line winding electric motor 83. The rolling shade carrier (10) is a C-shaped hollow tube wherein a shaft tube (11) and a spring (12) are disposed. When one end of the rolling shade (20) is fixed on the shaft tube (11), the two ends of rolling shade carrier (10) can be sealed with two covers (13), and the rolling shade (20) can be kept in a wound retracted condition in the rolling shade carrier (10) through the compressive force of the spring (12).

Figure 9:
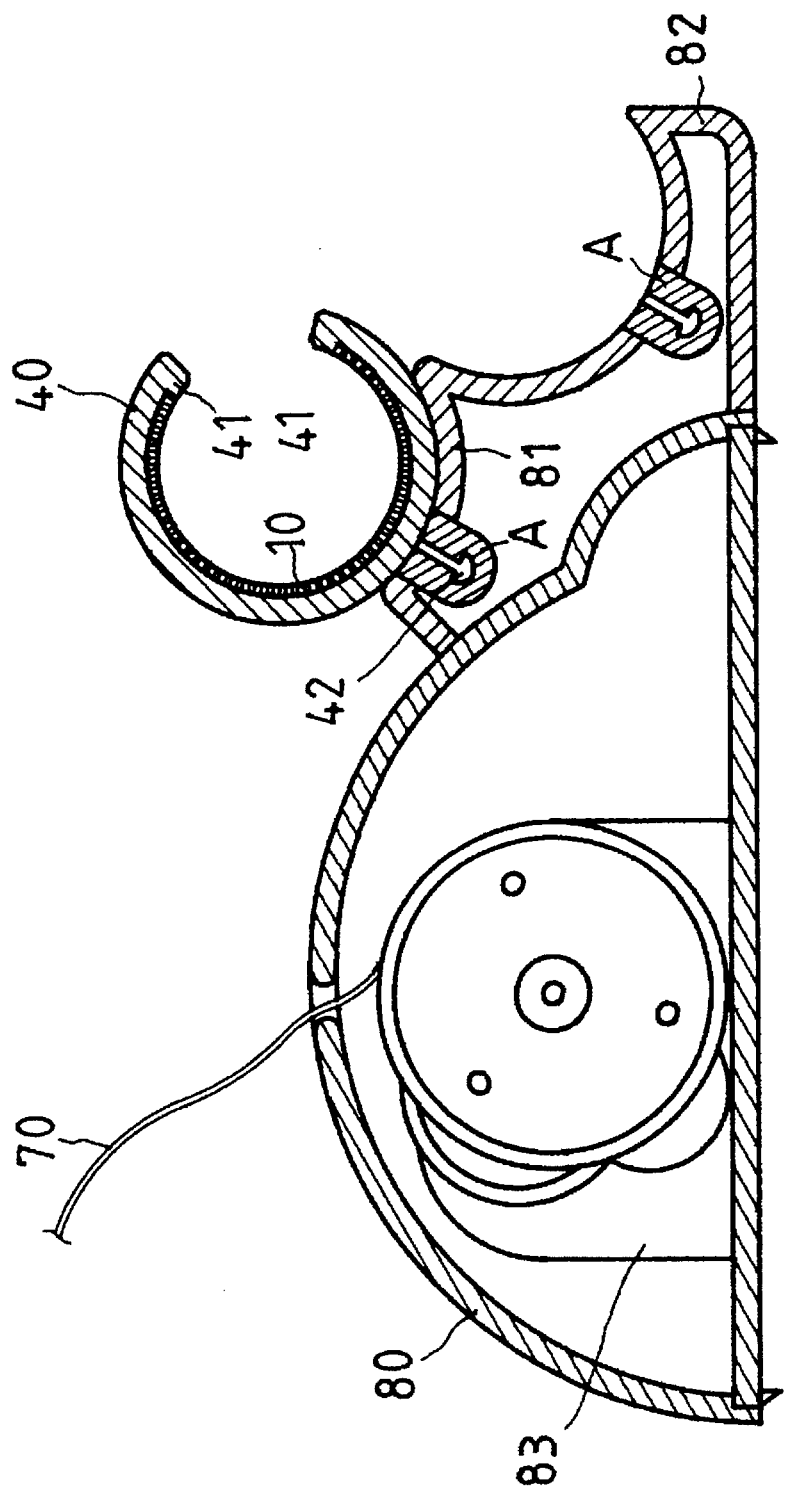
FIG. 9 is a transverse sectional view of motor base that forms part of the FIG. 1 of the present embodiment invention.

As shown in FIG. 5 and 9, the two end edges on the front side of the fixed clip (40) are provided with two hooks or lips (41), and the rear side thereof is provided with a convex lug or catch (42) that fits into a mounting slot or groove A. When the rolling shade carrier (10) is inserted into the fixed clip (40), the two hooks (41) catch and fix the rolling shade carrier (10) against disengagement from clip 40. The convex catch (42) can be inserted into the groove (A) on the upper seat (81) or lower seat (82) provided on the motor base (80) so that the fixed clip (40) can be fixed in two alternate positions on the motor base (80). The upper seat (81) and lower seat (82) on the motor base (80) are designed to let the fixed clip (40) choose a higher or lower position so as to provide clearance for the protruding articles in the car such as the car stereo speaker.

As shown in FIG. 1, 5, 6 and 7, the two end edges on the front side of movable clip (30) are also provided with two hooks or lips (31), and the rear side thereof is provided with a recess or sockets (32); when the rolling shade carrier (10) is extended through the movable clip (30), the hooks (31) can engage the confronting edges of the rolling shade carrier (10), to enable a bolt 33 to clamp the rolling shade carrier (10) against the clip as shown in FIG. 8. In order to adjust the effective height of the two support rods (50), it is necessary to first turn the bolt (33) loose so as to release the clip from the rolling shade carrier (10) as shown in FIG. 7. Then as shown by the dotted lines in FIG. 6, the position of each movable clip (30) can be optionally change so as to adjust the height of two support rods (50). The recess (32) in each clip 30 is designed to receive the bottom end of the associated support rod (50); the top ends of rods 50 are inserted into holes on the pulley holder (60). As shown in FIG. 2, a sphere (51) is formed at the top end of each support rod 50 for insertion into the mating hole on the holder (60)

so that the support rods (50) can bear the holder (60) against the ceiling of the automobile.

As shown in FIG. 2 and 4, the pulley holder (60) is provided with a clip (62) which carries a hook or cradle (63) whereon a pulley (65) and a pulley seat (64) can be disposed. When the tractive line (70) is pulled out from the line winding motor (83) in the motor base (80) and trained around pulley 65, the line can be attached to the line clip (21) on the rolling shade (20). A motor control switch (90) can be pressed upward (U) or downward (D) so as to allow the rolling shade (20) to be moved to the operating position (FIG. 1) or the retracted position within carrier 10.

FIG. 3 and 4, show the device adjusted to permit the rolling shade to be operated manually. Pulley 65 and pulley seat 64 are removed from hook 63, and line attachment clip 21 is replaced by a manual grip 22. The grip (22) has two ears (23) which can be hung on the hook (63) so that the rolling shade (20) can be fixed on the holder (60) without becoming disengaged therefrom.

The structure of the rolling shade device for rear window of car according to the present invention is simple but the combination, installation and operation thereof are very convenient.

I claim:

1. A rolling shade device for the rear window of an automobile, comprising:

a base (80) having an electrically-operated line wind-means thereon;

a first concave clip (40) mounted on said base;

a horizontal tubular carrier (10) extending through said first clip, said carrier having opposite ends thereof equidistantly spaced from said first clip so that the clip is centrally disposed relative to the carrier ends;

said first clip having a clamped connection with said carrier, whereby the carrier is supported by said base;

a flexible shade element (20) windable between a spirally wound retracted condition within said tubular carrier and an operative planar condition extending from said carrier; said shade element having an exposed edge movable in a generally vertical direction when the shade element is moved from its retracted condition to its operative planar condition, whereby said shade element is enabled to substantially cover the rear window of an automobile when it is in its operative condition;

a holder (60) adapted to be positioned against the interior surface of an automobile roof proximate to the automobile rear window, said holder comprising a line-guidance pulley (65);

second and third concave clips (30) slidably encircling said tubular carrier for adjusting movements thereal-ong; said second clip being located between said first clip and one end of the tubular carrier; said third clip being located between said first clip and the other end of said carrier;

each one of said second and third clips having a clamp member (33) engageable with the carrier to hold the respective clip in an adjusted position on the carrier;

a first support rod (50) extending between said second clip and said holder; a second support rod (50) extending between said third clip and said holder;

said second and third clips being movable along said carrier to exert end wise compression forces on the respective support rods, whereby the support rods are enabled to collectively bias said holder against an automobile roof; and a tractive line (70) extending from said line-winding means, around said pulley, and to the exposed edge of said shade element, whereby said line-winding means is enabled to move said shade element from its retracted condition to its operative planar condition;

said second and third clips being clamped to said tubular carrier so that said support rods exert downwardly divergent stabilizing forces on the carrier.

2. The rolling shade device of claim 1, wherein said holder comprises a cradle (63); said pulley being removably disposed on said cradle, whereby said pulley can be lifted from said cradle; and a manual hand grip attachable to the exposed edge of said shade element for suspensive connection to said cradle when said pulley is removed from said cradle.

* * * * *